(12) United States Patent
Stoelben et al.

(10) Patent No.: US 11,204,272 B2
(45) Date of Patent: Dec. 21, 2021

(54) DISPENSING CLOSURE

(71) Applicant: Obrist Closures Switzerland GMBH, Reinach (CH)

(72) Inventors: Peter Stoelben, Mosel (DE); Patrick Schmidt, Zell-Kaimt (DE)

(73) Assignee: OBRIST CLOSURES SWITZERLAND GMBH

( * ) Notice: Subject to any disclaimer, the term of this patent is extended or adjusted under 35 U.S.C. 154(b) by 0 days.

(21) Appl. No.: 16/070,476

(22) PCT Filed: Jan. 18, 2017

(86) PCT No.: PCT/EP2017/051015
§ 371 (c)(1),
(2) Date: Jul. 16, 2018

(87) PCT Pub. No.: WO2017/125457
PCT Pub. Date: Jul. 27, 2017

(65) Prior Publication Data
US 2019/0277684 A1    Sep. 12, 2019

(30) Foreign Application Priority Data
Jan. 18, 2016    (GB) ...................... 1600894

(51) Int. Cl.
*G01F 11/02*    (2006.01)
*B67D 3/02*    (2006.01)
(Continued)

(52) U.S. Cl.
CPC .......... *G01F 11/025* (2013.01); *B65D 77/067* (2013.01); *B65D 83/00* (2013.01); *B67D 3/02* (2013.01); *B67D 3/043* (2013.01)

(58) Field of Classification Search
CPC .......... G01F 11/025; B67D 3/02; B67D 3/043; B67D 3/045; B65D 77/067; B65D 83/00
See application file for complete search history.

(56) References Cited

U.S. PATENT DOCUMENTS 3,263,875 A * 8/1966 Lofdahl ................. B65D 25/38
222/518
3,595,445 A * 7/1971 Buford ............... B65D 47/2025
222/213
(Continued)

FOREIGN PATENT DOCUMENTS

DE    3628417    2/1988
FR    2671538    11/1991
(Continued)

OTHER PUBLICATIONS

Morris, Leah, British Search Report (GB1600894.8) dated Feb. 29, 2016.
(Continued)

*Primary Examiner* — Frederick C Nicolas
(74) *Attorney, Agent, or Firm* — C. Brandon Browning; Maynard, Cooper & Gale, PC (57) ABSTRACT

A push-button dispensing closure is provided and comprises a dispensing passage, a push button and a dosing chamber. The closure is movable between a first, closed position in which: the push button is released, the dosing chamber can fill with flowable product, and product cannot pass from the dosing chamber to the dispensing passage; and a second, open position in which: the push button is depressed such that product can flow from the dosing chamber through the dispensing passage and product cannot flow into the dosing chamber.

16 Claims, 9 Drawing Sheets

(51) Int. Cl.
  *B67D 3/04*   (2006.01)
  *B65D 77/06*  (2006.01)
  *B65D 83/00*  (2006.01)

(56) References Cited

U.S. PATENT DOCUMENTS

| | | | | |
|---|---|---|---|---|
| 3,863,673 | A * | 2/1975 | Sitton | B67C 9/00 |
| | | | | 137/614.11 |
| 4,315,582 | A * | 2/1982 | Micallef | B05B 11/3001 |
| | | | | 222/148 |
| 4,440,316 | A * | 4/1984 | Christine | B65D 47/248 |
| | | | | 222/183 |
| 4,493,440 | A * | 1/1985 | von Buelow | A47K 5/1204 |
| | | | | 222/109 |
| 4,674,659 | A * | 6/1987 | Micallef | B05B 11/3001 |
| | | | | 222/148 |
| 4,687,123 | A * | 8/1987 | Hyde | F16K 21/04 |
| | | | | 222/518 |
| 4,930,689 | A * | 6/1990 | Stumpf | B67D 3/043 |
| | | | | 137/588 |
| 5,158,206 | A * | 10/1992 | Kobayashi | B65D 47/261 |
| | | | | 222/153.11 |
| 5,605,256 | A * | 2/1997 | Fan | A47K 5/1204 |
| | | | | 222/181.2 |
| 5,842,609 | A * | 12/1998 | Higgins | A47K 5/1204 |
| | | | | 222/181.3 |
| 6,016,936 | A * | 1/2000 | Fan | A47K 5/1204 |
| | | | | 222/181.1 |
| 6,045,119 | A * | 4/2000 | Erb | B67D 3/043 |
| | | | | 251/251 |
| 6,401,752 | B1 * | 6/2002 | Blackbourn | B67D 3/044 |
| | | | | 137/588 |
| 7,513,395 | B2 * | 4/2009 | Labinski | B67D 3/044 |
| | | | | 137/588 |
| 7,699,192 | B2 * | 4/2010 | Dunne | G01F 11/28 |
| | | | | 222/153.11 |
| 8,561,846 | B2 * | 10/2013 | Hauner | B67B 7/26 |
| | | | | 222/153.01 |
| 8,602,387 | B2 * | 12/2013 | Wrigley | B65D 47/283 |
| | | | | 222/518 |
| 8,967,436 | B2 * | 3/2015 | Andersen | B65D 83/205 |
| | | | | 222/402.13 |
| 9,862,533 | B2 * | 1/2018 | Stever | B67D 3/043 |
| 10,065,849 | B2 * | 9/2018 | Van Der Molen | B67D 3/045 |
| 10,131,530 | B2 * | 11/2018 | Trettin | B67D 3/045 |
| 10,994,986 | B2 * | 5/2021 | Schmidt | B67D 3/045 |
| 2004/0016775 | A1 | 1/2004 | Ouyoung | |
| 2008/0245821 | A1 * | 10/2008 | Itzkowitz | A45D 34/04 |
| | | | | 222/190 |
| 2008/0283790 | A1 | 11/2008 | Wrigley | |
| 2017/0066641 | A1 * | 3/2017 | Van Der Molen | F16K 41/10 |
| 2017/0107094 | A1 * | 4/2017 | Van Der Molen | F16K 1/12 |
| 2020/0031658 | A1 * | 1/2020 | Schmidt | B67D 3/045 |

FOREIGN PATENT DOCUMENTS

| | | |
|---|---|---|
| GB | 2361229 | 10/2001 |
| WO | WO200210037 A1 | 2/2002 |
| WO | WO2005059480 A1 | 6/2005 |

OTHER PUBLICATIONS

Stitou, Adel, Written Opinion of the Int'l Searching Authority (PCT/EP2017/051015) dated Jan. 8, 2017.
Baytekin, Huseyin, "Europe Search Report for Europe App 17702541.8," European Patent Office; dated Dec. 4, 2020.

* cited by examiner

DISPENSING CLOSURE

CROSS-REFERENCE TO RELATED APPLICATIONS

This application is a national stage under 35 U.S.C. 371 of International Application No. PCT/EP2017/051015 having an international filing date of Jan. 18, 2017 (currently published). International Application No. PCT/EP2017/051015 cites the priority of GB Patent Application No. 1600894.8, filed Jan. 18, 2016(abandoned).

Field of Invention

The present invention relates to a dispensing closure, which can be attached to a container, while such containers are arranged for storing a fluid or another flowable medium, which can be dispensed through a dispensing passage of the dispensing closure.

SUMMARY OF INVENTION

The present invention provides a push-button dispensing closure comprising a dispensing passage, a push button and a dosing chamber, the closure is movable between a first, closed position in which the push button is released, the dosing chamber can fill with flowable product, and product cannot pass from the dosing chamber to the dispensing passage, and a second, open position in which the push button is depressed and product can flow from the dosing chamber through the dispensing passage.

The closure may comprise a body which provides the dispensing passage.

The push-button may be formed separately from, and be movable with respect to, the body.

The dispensing chamber may be formed separately from the body.

The body may be attachable to a container. Engagement means such as a screw thread or a snap bead may be provided on or by the body for this purpose.

In some embodiments at least part of the push-button is formed from a resilient material, for example a thermoplastic elastomer (TPE), and is deformed to move the closure between the open and closed positions. In other embodiments the push-button is rigid.

The closure may further comprise a piston movable to open/close the dosing chamber to product fill, and to open/close the path from the dosing chamber to the dispensing passage.

The piston may define part of the dosing chamber. In one embodiment, for example, the piston includes a dosing chamber cover.

The piston may comprise one or more dispensing apertures through which product can pass when the closure is in the open position.

The dosing chamber may comprise one or more fill windows.

The closure may further comprise a vent path for allowing the dosing chamber to vent as the closure moves from the open position back to the closed position.

Some aspect and embodiments of the present invention may be thought of as a dosing press-tap/push-button closure.

The present invention also provides a closure as described herein in combination with a container.

According to an aspect of the present invention there is provided a dispensing tap comprising a body which is attached or attachable to a container, the body having a dispensing orifice, and a piston movable within the body between a dispensing position in which flowable product can pass through the orifice and a sealing position in which fluid cannot pass through the orifice, in which the piston comprises one or more dispensing apertures through which product can pass when the piston is in the dispensing position to reach the dispensing orifice.

The tap may comprise a press button for moving the piston between the dispensing and sealing positions.

In some embodiments, in the sealing position the button is generally dome-shape. In other embodiments, in the sealing position the button is generally flat.

The button may formed from a thermoplastic elastomer (TPE) material.

The piston may comprise a stem and a cylindrical sealing wall. The stem may be joined to the wall by a plurality of spokes, said spokes defining a plurality of dispensing apertures therebetween.

A further aspect provides a continuous flow press tap comprising a body which is attached or attachable to a container, the body having a dispensing orifice, and a mobile piston movable within the body between a first position in which product can pass through the orifice and a second position in which it cannot, in which a tubular terminal dispensing conduit extends beyond the orifice, the orifice having a first cross-sectional shape and the conduit has a second cross-sectional shape, the first and second shapes being different from each other.

The first shape may be selected from the group of generally: circular, square, oval, ellipsoidal, triangular or polygonal.

The second shape may be selected from the group of generally: circular, square, oval, ellipsoidal, triangular or polygonal.

In one embodiment the first shape is generally elliptical and the second shape is generally square.

A further aspect provides a dispensing pack comprising a container filled with a flowable product and a dispensing tap attached to the container for controlling flow of product out of the container, in which the flowable product has a viscosity in the range 4.000-6.000 cps at 0.05 $s^{-1}$.

The product may be a laundry care product.

A further aspect provides a dispenser comprising a body which is attached or attachable to a container, the body having a dispensing orifice through which flowable product from the container can be dispensed in use, the body including a product tunnel through which product passes to reach the dispensing orifice, the dispenser further comprising a mobile piston movable within the product tunnel along a path having a piston movement axis between a first position in which product can flow through the orifice in a direction generally orthogonal to the piston movement axis, and a second position in which it cannot, the dispenser further comprising a resilient push button for moving the piston from the second position to the first position, the button being biased to keep the piston in the second position and depressable to move the piston to the first position, in which the piston comprises one or more dispensing apertures through which product can pass when the piston is in the first position to reach the dispensing orifice, and in which a tubular terminal dispensing conduit extends beyond the orifice, the orifice having a first cross-sectional shape and the conduit has a second cross-sectional shape, the first and second shapes being different from each other.

The product tunnel may be generally cylindrical.
The product tunnel may be generally straight.
The product tunnel may have a generally circular section.

The body may be formed as a first part, the piston may be formed as a second part and the button may be formed as a third part.

The body may include a base provided with a screw thread formation.

The tubular terminal dispensing conduit may be oriented approximately orthogonally to the product tunnel.

The present invention also provides a tap/dispenser/closure as described herein in combination with a container.

In some embodiments the tap is designed to work with high/medium-high viscous products, for example with a product viscosity in the range: 4.000-6.000 cps at 0.05 s−1.

The present invention also provides for a container in combination with a press tap closure for dispensing and/or dosing viscous products in the range of 4.000-6.000 cps at 0.05 s−1.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combination other than those explicitly set out in the claims.

The present invention will now be more particularly described, by way of example, with reference to the accompanying drawings.

In the following description, all orientational terms, such as upper, lower, radially and axially, are used in relation to the drawings and should not be interpreted as limiting on the invention or its connection to a closure.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed and as well as individual embodiments the invention is intended to cover combinations of those embodiments as well. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent; however, the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Detailed Description of the Drawings

Referring now to the drawings, there is shown a dispensing closure generally indicated 10.

Figure 1:
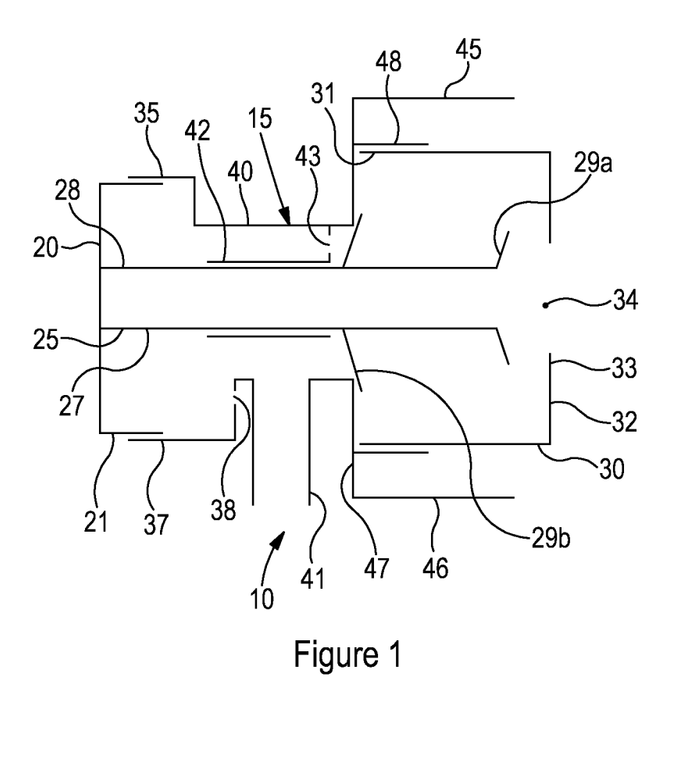
FIG. 1 is a sectional view of a dispensing closure in accordance with the present invention in a closed position.
Figure 2:
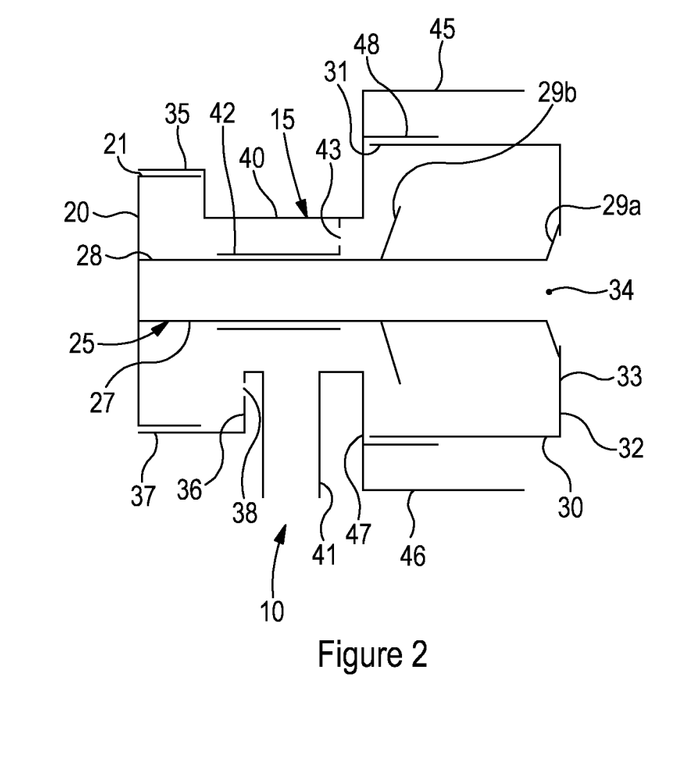
FIG. 2 is a sectional view of the dispensing closure of FIG. 1 in an open position.

The closure 10 comprises a body 15, a push-button 20, a piston 25 and a dosing chamber 30.

The body 15 comprises a first portion 35, a second, central portion 40 and a third portion 45.

The first portion 35 includes an annular wall 37 which receives a side skirt 21 of the button 20. The wall 37 is partially closed at one end by a radial wall 36 which includes a vent aperture 38.

The second portion 40 includes a dispensing passage 41 and a central guide tube 42 in which a piston 25 slides. A vent aperture 43 is also provided in the second portion. The third portion 45 comprises a generally cylindrical skirt 46 partially closed at one end by an annular top plate 47. The second portion 40 extends from the centre of the top plate. An annular wall 48 depends from the top plate 47. In use the third portion 45 will be attached to a container (not shown) such as a mineral water bottle or the like.

The dosing chamber 30 is generally cup-shaped and is open at both ends 31, 32. One end 31 of the chamber is push fitted into the third portion 45 where it fits into the wall 48. The other end 32 includes an annular wall 33 which defines a central filling orifice 34.

The piston 25 comprise a cylindrical body 27 closed at one end 28 and at the other end having a flared flange 29a. A further flange 29b is provided along the body 27.

The part end 28 is attached to the push button 20 and therefore moves when it is depressed/released. The body 27 slides within the guide tube 42 in use.

In FIG. 1 the closure is shown in a closed position in which the button 20 is released. The piston 25 is in a fully withdrawn position in which the flange 29b seals against the top plate 47 and prevents fluid flowing out of the dosing chamber 30 into the passage 41. In addition, the flange 29a is withdrawn away from the chamber filling orifice 34. This means that fluid can enter the chamber 30 to charge the closure with a dose of product.

To operate the closure the button 20 is pressed. In this embodiment the button is rigid, but in other embodiment it may be deformable. In doing so the button 20 moves the piston 25 to the position shown in FIG. 2. In this position the flange 29b is pushed away from the top plate 47 which allows product to flow from the chamber 30 into the second portion 40 and out of the passage 41. In addition, the flange 29a now closes over the filling opening 34 to prevent further product flowing into the chamber during dispensing.

Once a dose has been dispensed the button 20 can be released and it will return to the position shown in FIG. 1. As the piston 25 moves away from the end position shown in FIG. 2 air can vent into the container (not shown) through the apertures 38, 43 and the chamber 30 so that the closure can recharge.

Figure 3:
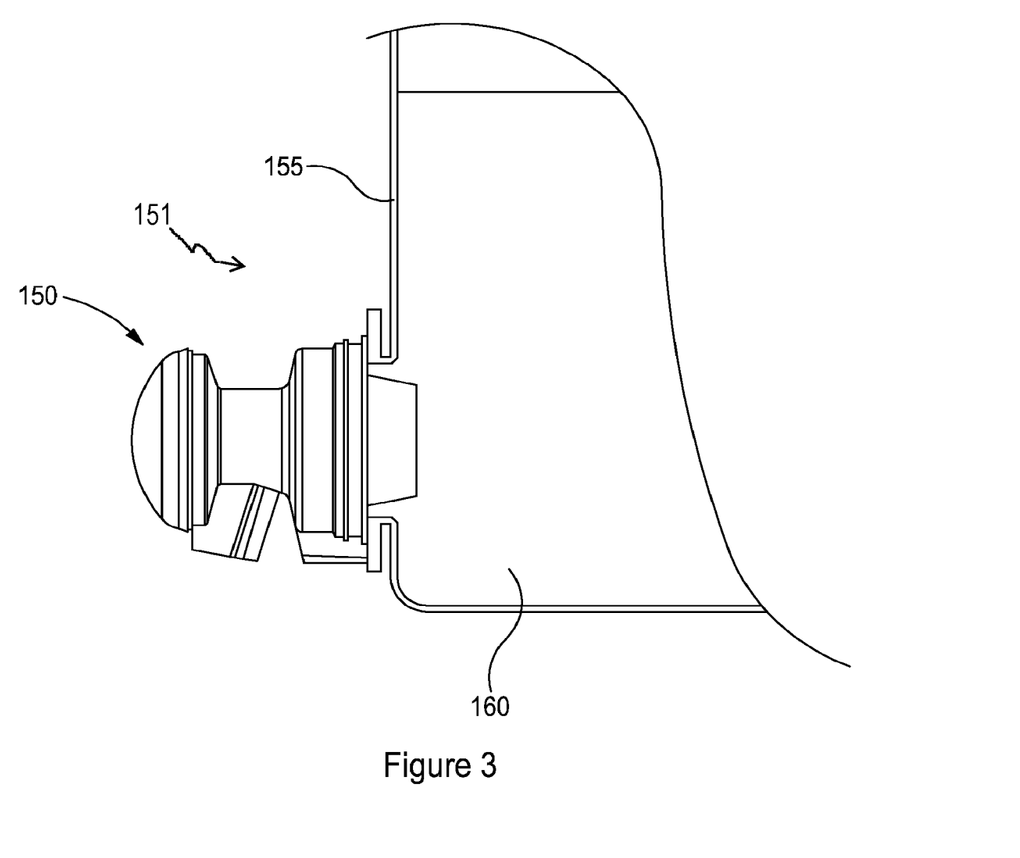
FIG. 3 is a partial sectional view of a press tap dosing closure in accordance with another embodiment of the present invention.

FIG. 3 shows a dispensing pack 151 including a press tap dosing closure 150 formed according to a further embodiment of the present invention and shown connected to a container 155 for dispensing flowable product 160 from the container.

Figure 4:
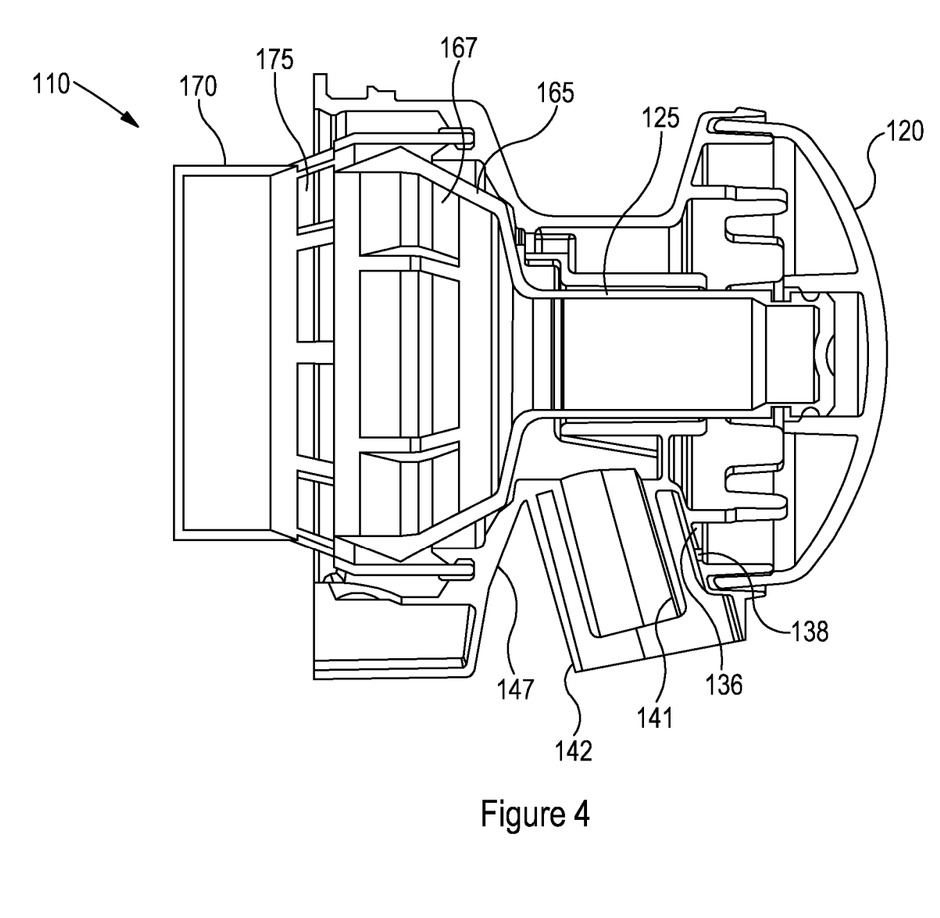
FIG. 4 is a sectional view of the press tap dosing closure of FIG. 3 in a closed position.
Figure 5:
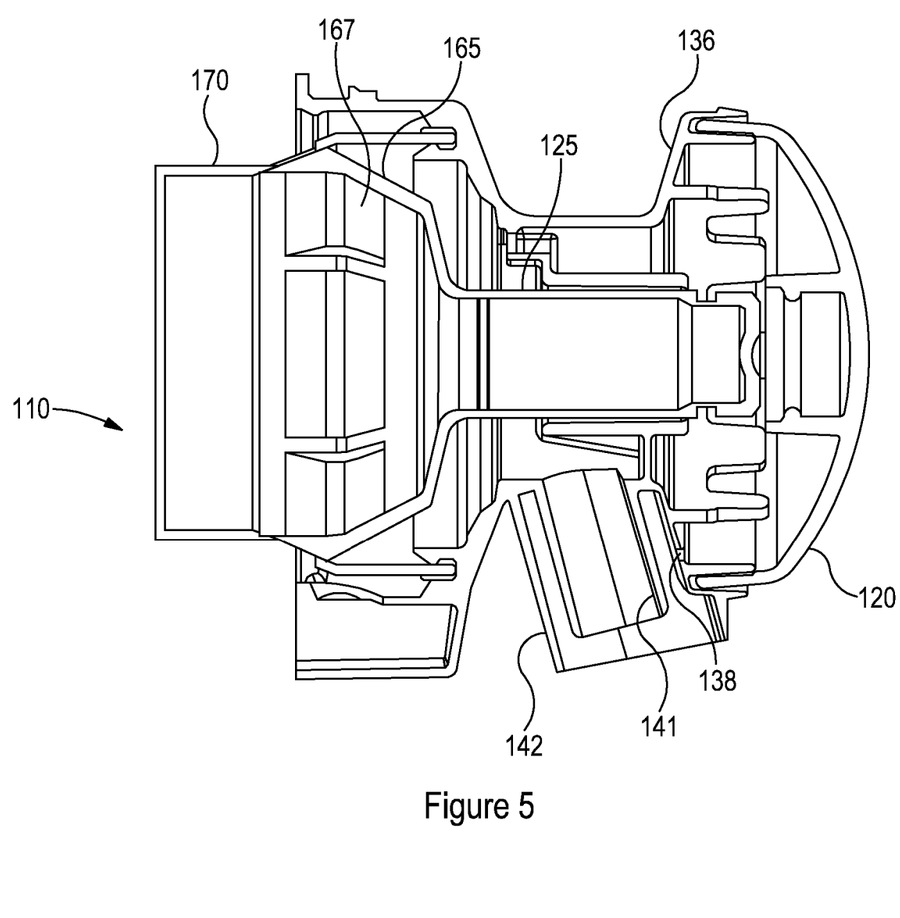
FIG. 5 is a sectional view of the press tap dosing closure of FIG. 3 in an open position.
Figure 6:
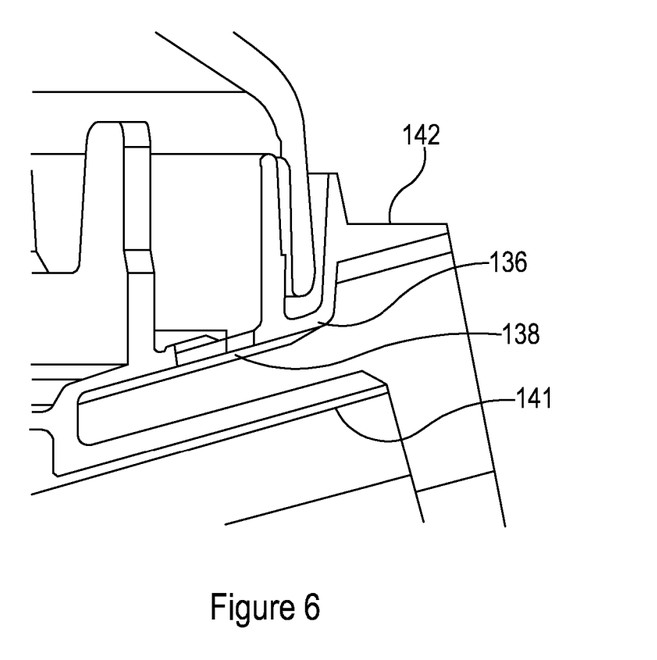
FIG. 6 is partial sectional view of the press tap dosing closure of FIG. 3.

The closure 110 is shown in more detail in FIGS. 4 to 6.

FIG. 4 shows the closure 110 in a closed position.

In this embodiment the end of the piston 125 opposite the button 120 provides part of the dosing chamber. More specifically, the end of the piston is formed as a generally hemispherical cover 165. The dosing chamber cover 165 has a plurality of circumferentially spaced flow windows 167.

The remainder of the dosing chamber is provided by a bucket-like member 170 which connects to the third portion 147. In this embodiment the member 170 is formed separately from the body, like a cassette. This means that different sized/shaped buckets could be fitted to change the dose and/or dosing characteristics e.g. 2 ml to 150 ml. The member 170 is also provided with a plurality of circumferentially spaced flow windows 175. This arrangement of windows is helpful because product can still enter the chamber even when the container is nearly empty.

In the closed position, the cover 165 seals against the top plate 147, preventing product from flowing to the passage 141. Product can, however, flow into the dosing chamber through the windows 175.

When the button 120 is pressed, the piston moves (to the left as shown in the drawing) to the position shown in FIG. 5. This causes the cover 165 to move to cover the windows 175, preventing further product entering the chamber. The cover has moved away from the body, so that product can now flow from the chamber out of the windows 167 to the passage 141.

When the button 120 is released the piston moves back to the position shown in FIG. 4, so that the cover once again seals against the body and the windows 175 are opened so that filling of the chamber can occur.

In this embodiment a double outlet tunnel arrangement is provided, with the inner passage 141 and also a coaxial outer passage 142 (which is slightly longer). The double tunnel is useful for dispensing of more viscous products (for example laundry care products, ketchups, mustard, honey, liquors).

In this embodiment a vent 138 is again provided in a radial wall 136, as shown best in FIG. 6. Air flow vents the product chamber via the chamber windows. The product windows in the cover allow exit of product from the chamber into the body (and to the dispensing passage) whilst venting occurs in parallel.

Figure 7:
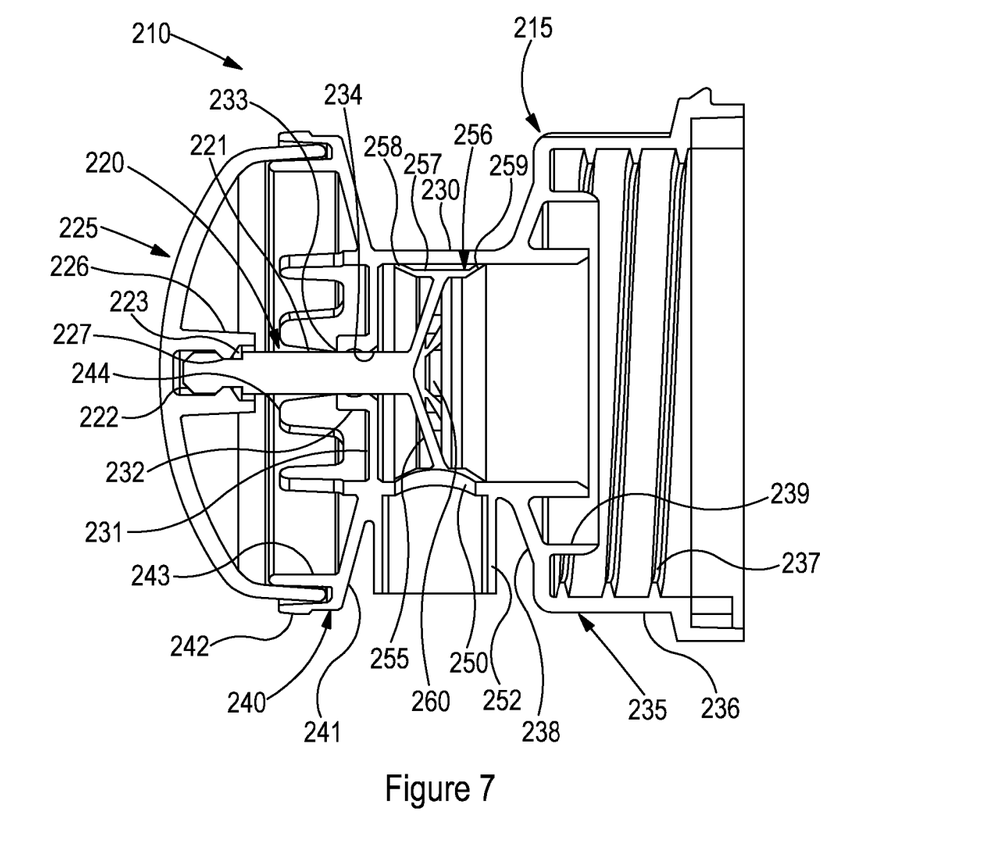
FIG. 7 is a sectional view of a dispensing tap in accordance with the present invention showing a button a relaxed position.
Figure 8:
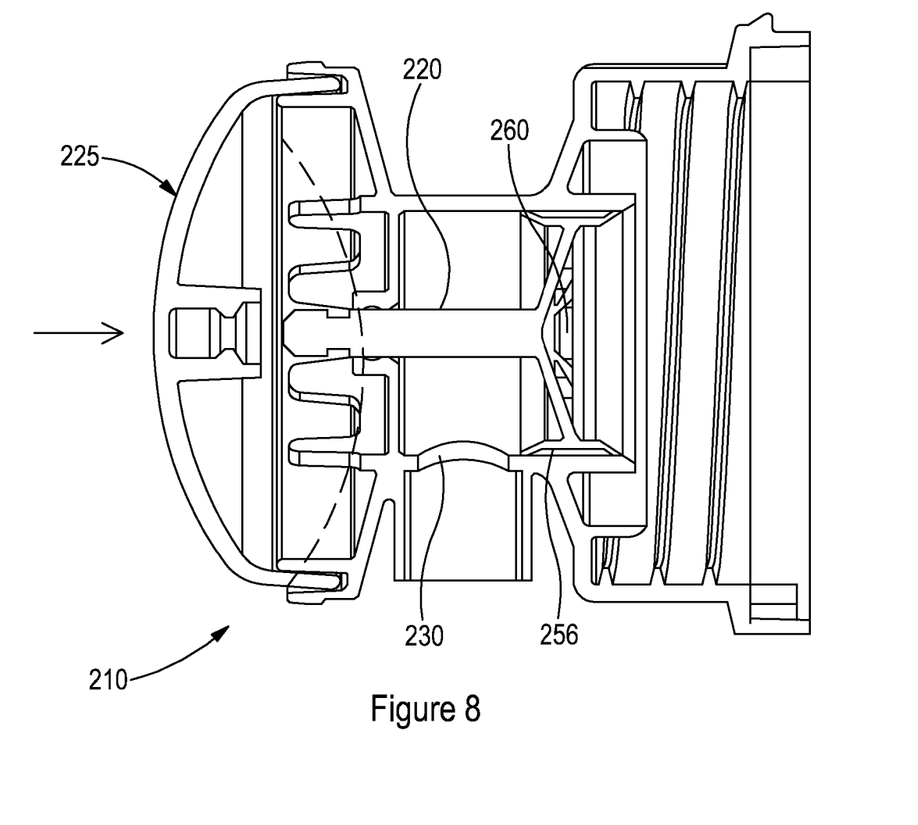
FIG. 8 is a sectional view of the dispensing tap of FIG. 7 in an open position.
Figure 9:
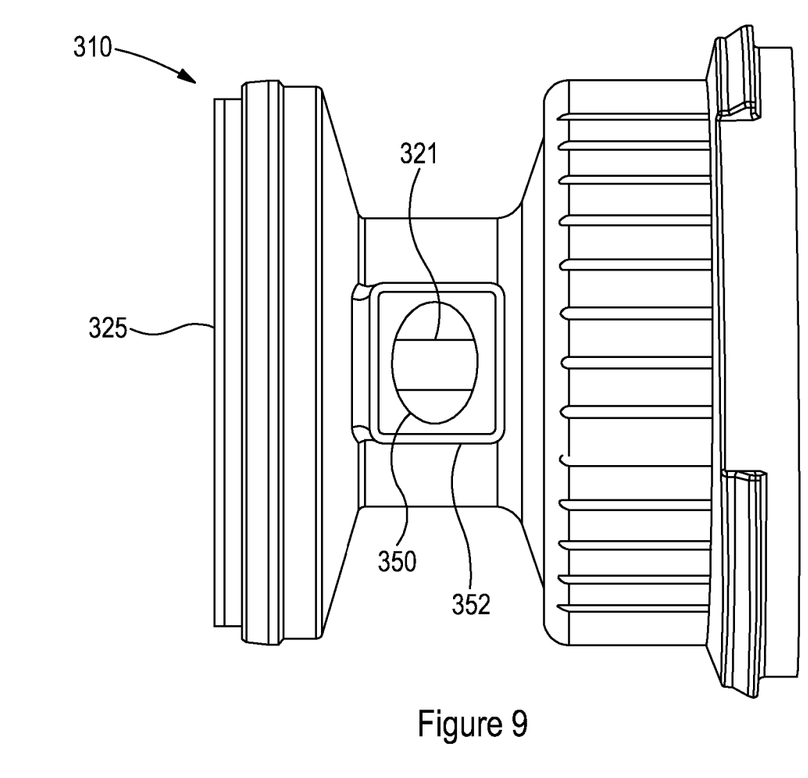
FIG. 9 is an elevational view a dispensing tap in accordance with another embodiment of the present invention.

Referring now to FIGS. 7 to 9, there is shown a dispensing tap generally indicated 210.

The tap 210 comprises a body 215, a piston 220 and a press button 225.

The body 215 comprises a central product tunnel 230, a base 235 which extends from one end of the tunnel 230 and a button dock 240 which extends from the other end of the tunnel 230.

The product tunnel 230 is generally cylindrical, being open at the base end, and partially closed at the dock end by a circular end plate 231 with a central annular wall 232 upstanding therefrom to define a central hole 233. The wall 232 includes an internal sealing bead 234.

The tunnel 230 also comprises an elliptical orifice 250 adjacent the plate 231. Extending from the orifice 250 is a terminal dispensing conduit 252 which has a generally square section.

The dock 240 extends from the tunnel 230 and comprises an inclined annular wall 241 from which extends an axial annular wall 242. Slightly radially inwardly of the wall, a further wall 243 extends so as to define an annular channel 243 therebetween. Extending from the periphery of the end plate 231 is a plurality of castellations 244.

The button 225 is generally dome-shape, the periphery of which is shaped so as to fit tightly into the channel 243. The interior of the button 225 is provided with a piston socket in the form of an annular wall 226. The wall 226 includes a retention bead 227 towards the free end thereof. In this embodiment the button 225 is formed from a TPE material.

The piston 220 comprises an elongate stem 221 one end of which includes a head portion 222 with a recess 223. The head portion 222 is shaped and sized so as to be received into the wall 226 so that the bead 227 engages in the recess 223 so that the piston is securely retained.

The stem 221 extends so as to pass through the hole 233. At the end of the stem 221 opposite the head portion 222, a plurality of inclined spokes 255 extend radially outwards and connect approximately half way along a cylindrical sealing wall 256. The spokes 255 are mutually spaced and defined between them are a plurality of dispensing apertures 260.

The sealing wall 256 includes a central portion 257 and a terminal wall portion 258, 259 at either end thereof which are inclined so as to seal against the interior of the tunnel 230.

The base 235 comprises a sidewall 36 with an internal screw thread 237. At one end of the sidewall 236 a kinked annular end plate 238 extends radially inwards and connects to the exterior of the tunnel 230. Around half way along the plate 238 an annular sealing wall 239 depends. The sidewall 236 and the sealing wall 239 are coaxial with the tunnel 230. In use the base 235 can be screwed on a container neck. The wall 239 will sealingly enter into the bore of the neck.

FIG. 7 shows the tap 210 with the button 225 in a relaxed position. In this position the piston 220 is in a withdrawn position. The sealing wall 256 is adjacent the end plate 231 and as such the central portion 257 of the piston sealing wall 256 overlays the orifice 250, with the wall portions 258, 259 positioned sealingly either side of the orifice 230. In this position, therefore, product cannot flow through the orifice 230.

To operate the tap 210 the button 225 is pressed inwards (the castellations 244 act as an end stop for depressing the button) as represented by the dotted line. This causes the piston 220 to move to the position shown in FIG. 8 and as a result the wall 256 is moved away from the orifice 230. Product can now flow through the apertures 260 of the piston 220 so that it can reach the orifice 230.

Product flows out of the orifice 230 and then through the dispensing conduit 252.

FIG. 9 shows part of a tap 310 formed according to a further embodiment. In this embodiment the button 325 is generally flat. Operation of the tap 310 is otherwise the same as for the tap 210.

Figure 10:
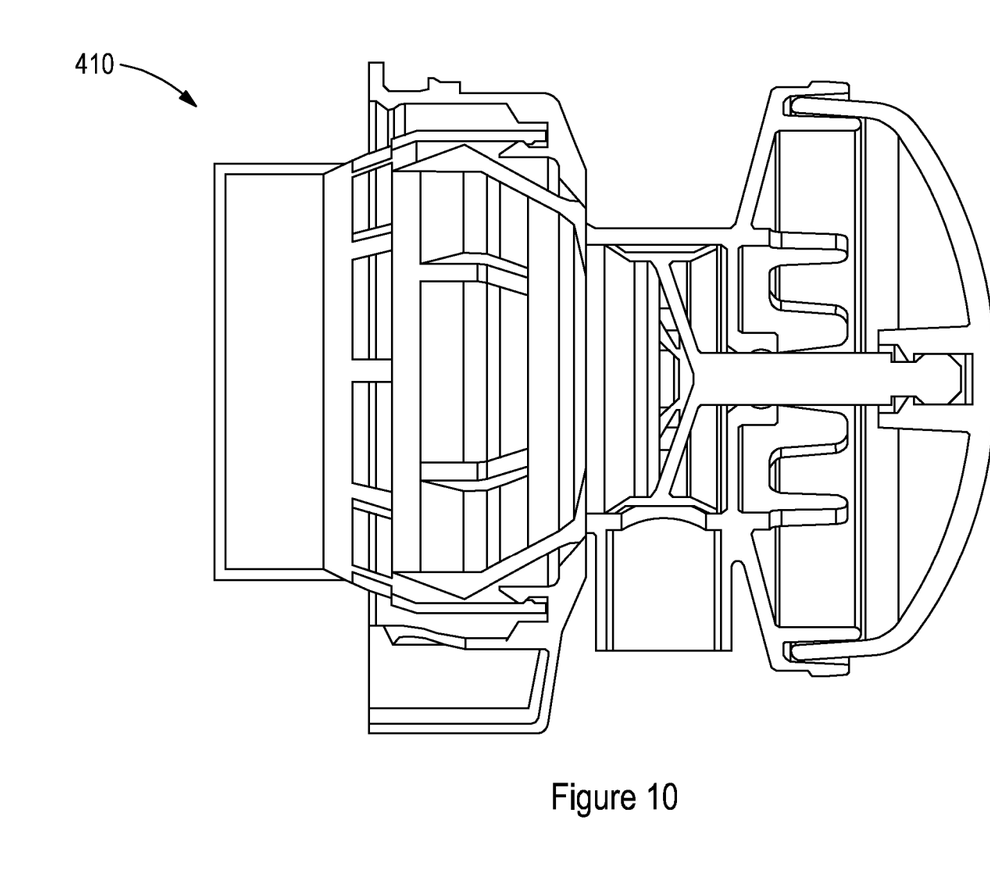
FIG. 10 is a sectional view a dispensing tap in accordance with yet another embodiment of the present invention.

FIG. 10 shows a tap 410. The tap 410 combines the front end of the tap 110 with the rear end of the tap 210 and is intended to show that different parts of the described embodiments can be combined in different combinations to those explicitly shown, for example the combination of a cylindrical piston (from 210) with the two-part dosing chamber (from 110). The cylindrical piston with double opening allows the dosing of viscous products. An air vent tunnel (similar to feature 142) and air vent (similar to feature 138) could also be provided. A flat button could also, for example, be provided.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

What is claimed:

1. A dispensing tap comprising a body which is attached or attachable to a container, the body having a dispensing orifice, a cylindrical sealing wall and a piston movable within the body between a dispensing position in which a flowable product can pass through the orifice and a sealing position in which fluid cannot pass through the orifice, wherein the cylindrical sealing wall overlays the orifice in the sealing position and the piston comprises a stem joined to the cylindrical sealing wall by a plurality of spokes, the plurality of spokes forming one or more dispensing apertures therebetween through which the product can pass when the piston is in the dispensing position to reach the dispensing orifice, and a dispensing passage provided by the body, a press button and a dosing chamber, a closure movable between a first, closed position in which the press button is released, the dosing chamber can fill with the flowable product, and the product cannot pass from the dosing chamber to the dispensing passage, and a second, open position in which the press button is depressed such that the product can flow from the dosing chamber through the dispensing passage and the product cannot flow into the dosing chamber.

2. A tap as claimed in claim 1, wherein the press button is configured for moving the piston between the dispensing and sealing positions.

3. A tap as claimed in claim 1, in which the press button is formed separately from and is movable with respect to the body.

4. A tap as claimed in claim 1, in which at least part of the dosing chamber is formed separately from the body.

5. A tap as claimed in claim 1, in which at least part of the press button is formed from a resilient material.

6. A tap as claimed in claim 1, in which the piston is movable to open/close the dosing chamber to product fill, and to open/close a path from the dosing chamber to the dispensing passage.

7. A tap as claimed in claim 6, in which the piston defines part of the dosing chamber.

8. A tap as claimed in claim 1 in which the dosing chamber comprises one or more fill windows.

9. A tap as claimed in claim 1, further comprising a vent path for allowing the dosing chamber to vent as the closure moves from the open position back to the closed position.

10. A tap as claimed in claim 1, further comprising a tubular terminal dispensing conduit which extends beyond the orifice, the orifice having a first cross-sectional shape and the tubular terminal dispensing conduit has a second cross-sectional shape, the first and second shapes being different from each other.

11. A tap as claimed in claim 10, in which the first shape is selected from the group of: circular, square, oval, ellipsoidal, triangular or polygonal.

12. A tap as claimed in claim 10, in which the second shape is selected from the group of: circular, square, oval, ellipsoidal, triangular or polygonal.

13. A tap as claimed in claim 10, in which the first shape is ellipsoidal and the second shape is square.

14. A dispensing pack comprising the container filled with the flowable product and the dispensing tap according to claim 1 attached to the container for controlling flow of product out of the container, in which the flowable product has a viscosity in the range 4.000-6.000 cps at $0.05s^{-1}$.

15. A pack as claimed in claim 14, in which the product is a laundry care product.

16. A tap as claimed in claim 1, wherein the cylindrical sealing wall comprises a central portion and an inclined terminal wall portion at each end of the central portion and in which in the sealing position the central portion overlays the orifice and the inclined terminal wall portions are positioned sealingly on either side of the orifice and prevent the product from passing through the orifice.

* * * * *